Feb. 13, 1968   J. A. BURNS ETAL   3,368,295
INVENTORY INDICATING DEVICE
Filed March 27, 1967   4 Sheets-Sheet 1

JOHN A. BURNS
CLARENCE H. RAUSCHENBERG
INVENTORS

BY Wm. E. Ford

ATTORNEY

Feb. 13, 1968  J. A. BURNS ET AL  3,368,295
INVENTORY INDICATING DEVICE
Filed March 27, 1967  4 Sheets-Sheet 2
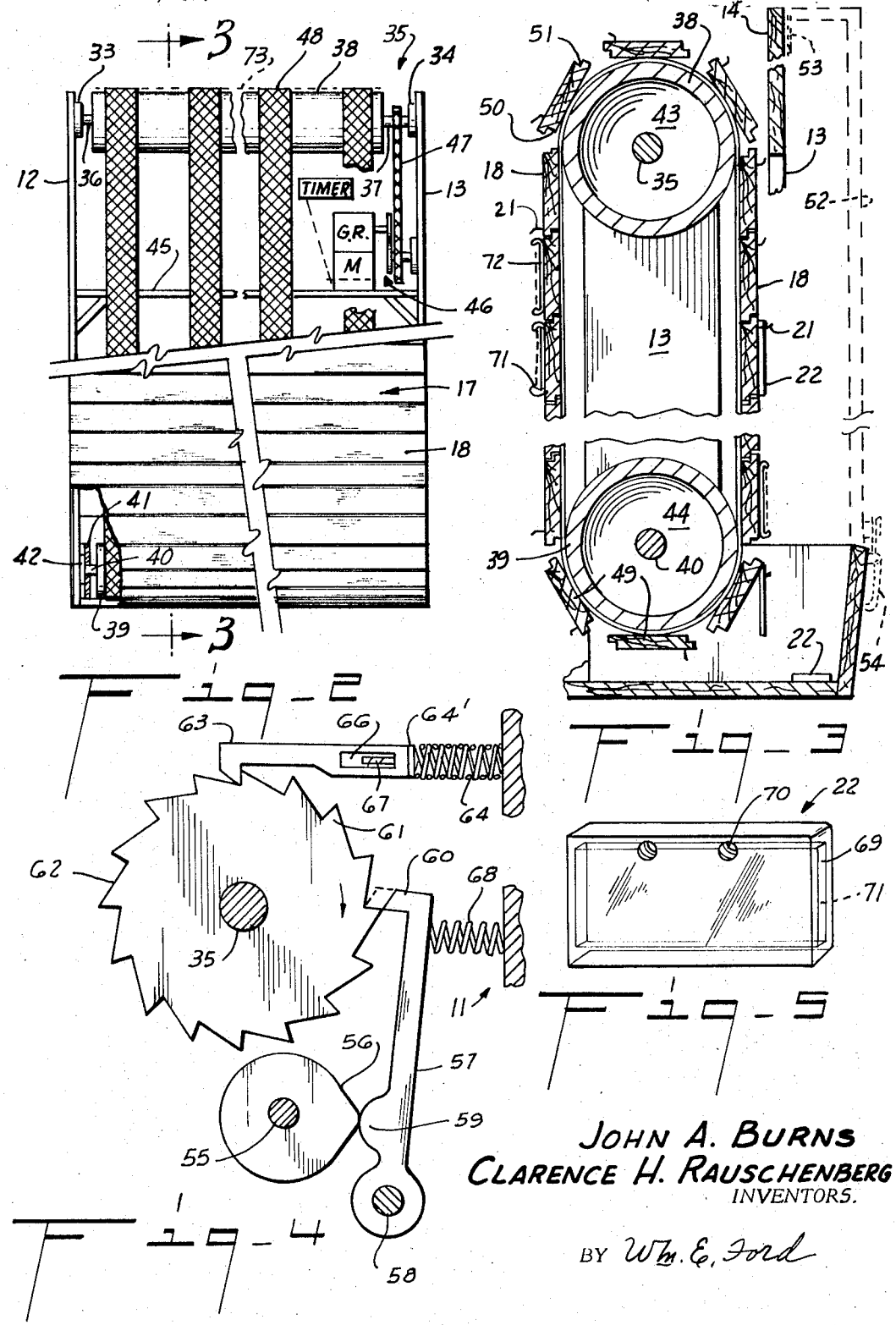
JOHN A. BURNS
CLARENCE H. RAUSCHENBERG
INVENTORS.
BY Wm. E. Ford
ATTORNEY

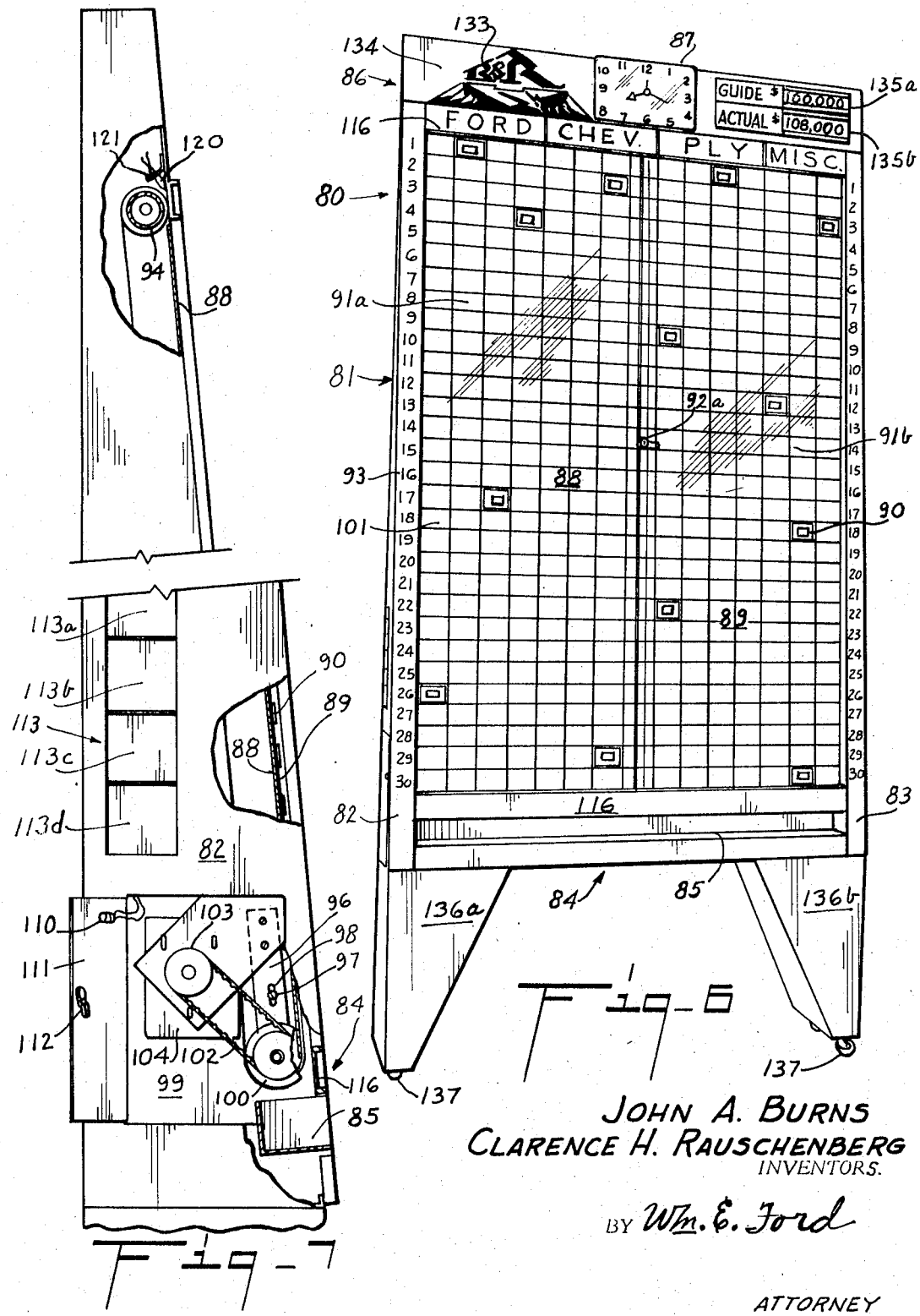

Feb. 13, 1968   J. A. BURNS ETAL   3,368,295
INVENTORY INDICATING DEVICE
Filed March 27, 1967   4 Sheets-Sheet 4
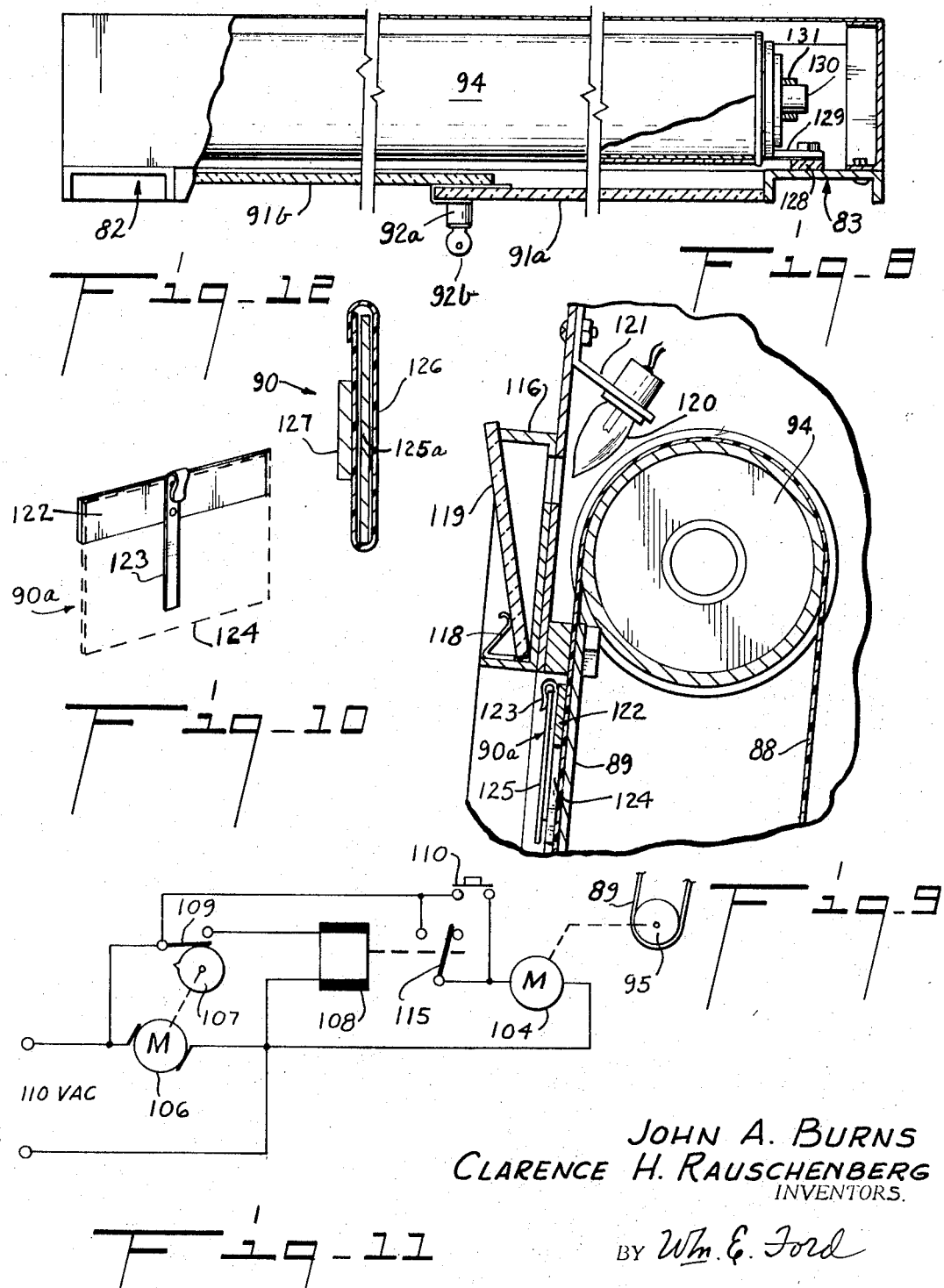
JOHN A. BURNS
CLARENCE H. RAUSCHENBERG
INVENTORS.
BY Wm. E. Ford
ATTORNEY – # United States Patent Office 3,368,295
Patented Feb. 13, 1968

3,368,295
INVENTORY INDICATING DEVICE
John A. Burns, Lake Providence, La., and Clarence H. Rauschenberg, Houston, Tex., assignors to B-T-R Industries, Inc., a corporation of Texas
Filed Mar. 27, 1967, Ser. No. 626,123
13 Claims. (Cl. 40—124)

ABSTRACT OF THE DISCLOSURE

Preferred invention provides vertically indexed frame mounting upper and lower rollers to drive transparent belt therearound and over metallic belt-width plate between rollers and divided into vertically aligned rectangles horizontally aligned with index spaces. Inventory members including magnetized means are disposed chronologically vertically and horizontally by type and condition on belt over rectangles. Electric timer starts motor to drive belt one index space per time interval for inventory member disposition on belt strip newly exposed over top plate strip as inventory members fall from belt strip moved below plate. Inventory at any time comprises inventory members on belt.

Specification

The invention relates to an inventory indicating device which is adapted to indicate visually at any instant of inspection the number of inventory items by type and condition, and their time under inventory; this application being a continuation-in-part application of co-pending application Ser. No. 517,548, filed Dec. 30, 1965, for Inventory Indicating Device, and now abandoned.

The invention, by way of illustration, is adapted to reflect the inventory, as on a used car lot, as to types and numbers of cars on the lot at any time, with the condition of each car inventoried being indicated.

It is consequently a primary object of the invention to provide an inventory indicating device which may indicate inventory items by type, by interval, and by period of intervals under inventory, and in manner that the device may be changed within a brief period of minutes, as once each day, to bring current the inventory.

It is also another object of the invention to provide an inventory indicating device of this class which eliminates the chances of human error, which minimizes paper work, and which can reflect an actual accurate inventory at any time of visual inspection, and in which the items under inventory may be selectively indicated graphically, as by color, thus to reflect the condition of each respective item under inventory.

It is also an important object of this invention to provide an inventory indicating device of this class which may be adapted to be shifted automatically once each predetermined time interval, and in amount commensurate with the passage of such time interval, any inventory items to be added following such shift being easily installed, and any inventory items to be removed as a shift is made being easily and automatically displaced.

It is also an object of the invention to provide an inventory indicating device of this class which provides accessible storage means for item indicia not representing inventory.

It is also a further object of the invention to provide an inventory indicating device of this class which provides time means for double checking the device against power failure of the periodically operated shifting means.

It is also another and most important object to provide a preferred form of this invention in which the belt is transparent and is moved over a plate of belt-width and between rollers, the plate being divided into vertically aligned rectangles horizontal aligned with the index spaces, with the inventory members including magnetized means to be disposed on the belt over selected rectangles on the plate therebelow; the inventory at any time comprising the inventory members on the belt.

Other and further objects will be apparent when the specification herein is considered in connection with the drawings, in which:

FIG. 2 is a front elevational view, part in section, as of the inventory indicating device shown in FIG. 1;

FIG. 3 is a side elevational view taken along line 3—3 of FIG. 2;

FIG. 4 is a side elevational view, partially diagrammatic, showing a shifting means alternative to the means indicated in FIG. 2, for periodically shifting an inventory indicating device; and FIG. 5 is an isometric view of an inventory item indicator or plaque means corresponding with the plaque means indicated in FIG. 1;

FIG. 6 is an isometric view of a preferred form of invention indicating device, also indicated as being adapted to a used car lot or automobile agency;

FIG. 7 is a side elevational view, part in section, taken along line 7—7 of FIG. 6;

FIG. 8 is a plan view, part in section, as taken along line 8—8 of FIG. 6;

FIG. 9 is an enlarged, fragmentary side elevational view through the upper roller and top structure of the preferred device;

FIG. 10 is an isometric view of one form of magnetized inventory member, illustrative of these indicia;

FIG. 11 is a circuit diagram of circuitry to operate timer and belt drive motors; and FIG. 12 is a cross-sectional view of the form of inventory members shown employed in FIG. 6.

Figure 1:
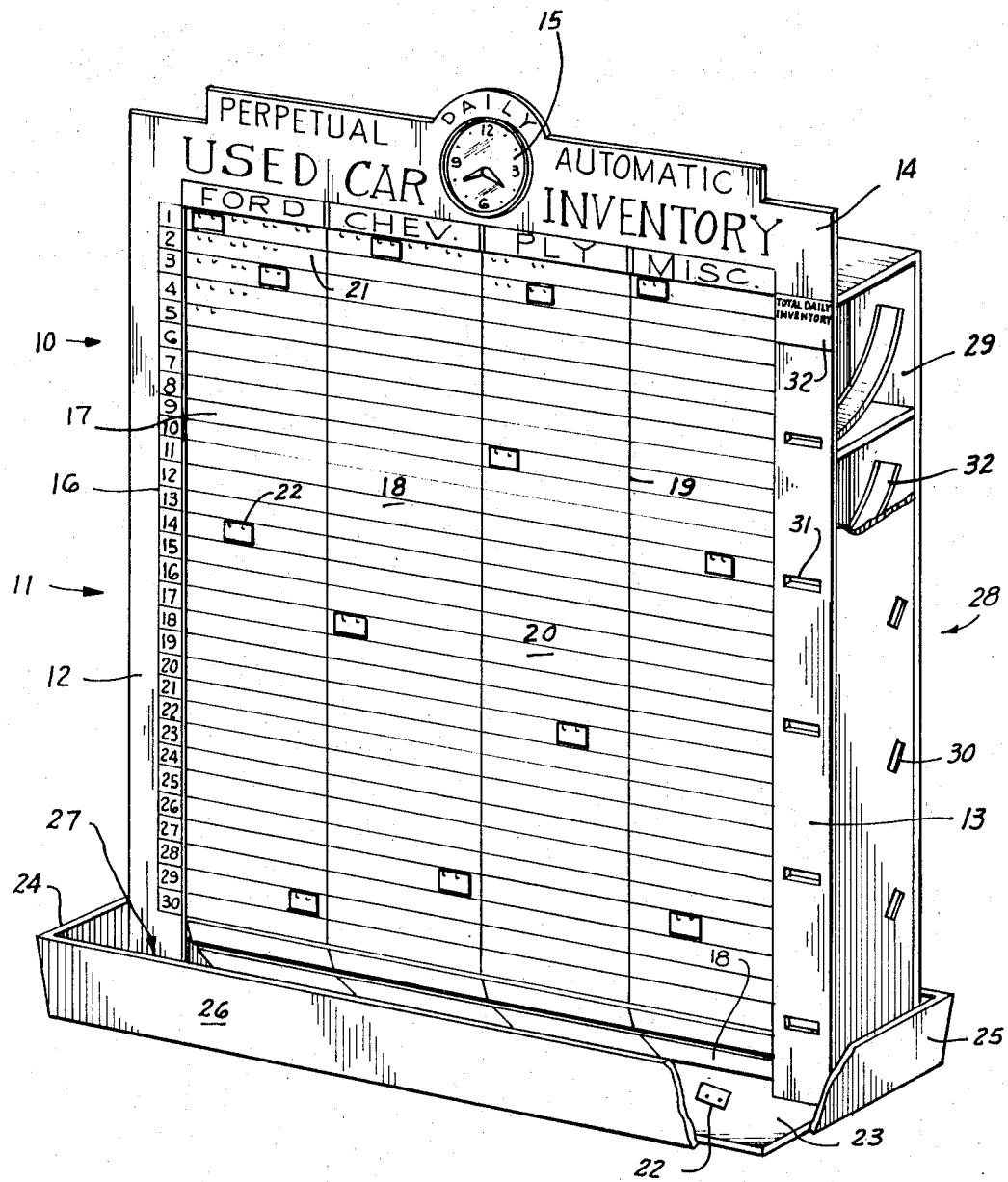
FIG. 1 is an isometric view of an inventory indicating device for indicating a used car lot or automobile agency inventory, and in a case where several types of automobiles are handled.

Referring now in detail to the drawings in which like reference numerals are applied to like elements in the various views, an inventory indicating device 10 is shown in FIG. 1 including a yoke-type frame 11 with upstanding side members 12 and 13, and a top cross member 14 also employable as a title board; a conventional clock 15 operable by the same source of electrical power as the shifting means, to be hereinbelow described, is shown in FIG. 1 mounted centrally of the title board 14.

The right side member 12 of the yoke-type frame 11 has vertically aligned thereon time interval indicia 16, corresponding in the instant case, to the number of days of a categorical period corresponding with the length of time an automobile may be in a category of tenure on the car lot. The vertically aligned time interval indicia outlined squares 16, all of the same height, as shown in FIG. 1, correspond with the days of a 30 day period, as in this trade it is customary to classify the tenure of cars on a lot as being within the 30 day period, the 60 day period or within the 90 day period.

A display face or inventory board 17, is shown divided into parallel, laterally, extending strip 18 of equal vertical height, such height also being equal to the height of the aforesaid outlined squares 16 of the vertical line of squares representative of days, provided as aforesaid on the upright right yoke member 12 adjacent to the vertically aligned right ends of the strips 18 as will be hereinbelow described.

The display board 17 has three laterally spaced apart, vertically extending lines 19 provided thereon to divide the board into four parallel, vertically extending areas 20, with headings thereabove on the cross-member or title board 14 indicating that the types or makes of automobiles respectively inventoried are Fords, Chevrolets, Plymouths, and miscellaneous other types.

Each strip 18 has horizontally aligned pairs of hooks 21 thereon to have plaques or card cases 22, to be hereinbelow described, installed over selective pairs of hooks, the aligned pairs of hooks extending laterally across each strip 18, and thus providing pairs of hooks in each area 20 traversed.

The upright or side yoke members 12 and 13 upstand from a base 23, comprising the bottom of the frame 11, and thus adapted to support the frame, as by resting on the floor of a building. Side base boards 24 and 25 extend forwardly from the respective uprights 12 and 13, and a front base board 26 bearing against the forward edge of the base 23, upstands thereabove and joins the forward edges of the side base boards 24 and 25, thus providing a trough 27 forwardly below the lower part of the display board 17.

As shown in FIG. 1, the car lot inventoried on the date depicted, has a Ford car in the first, third, fourteenth and twenty-ninth day of a 30 day period, and the color of the respective indicating plaques 22 can designate whether the respective car represented is in the first, second, or third 30 day period of tenure. Correspondingly, Chevrolet cars are indicated as being one each in the first, seventeenth and twenty-seventh day of a 30 day tenure; Plymouth cars are indicated as being in the second, ninth and twentieth day of a 30 day tenure; and a miscellaneous make of car is indicated as being in each of the first, twelfth and twenty-seventh day of a 30 day tenure. In these aforesaid instances, the color of the respective plaques indicates in which of the categorical 30, 60 or 90 day tenure periods a respective car may fall.

Also, in FIG. 1, there is shown a plaque 22 which has fallen from the hooks, not shown, of a lowermost strip 18, as it has changed direction from frontwardly facing in order to pass under a lower roller means, not shown.

The frame 11 includes a side storage closet 28 to the rear of the left upright yoke member 13, and such closet 28 is divided into five compartments 29 vertically disposed one above the other, each being provided with a side return slot 30, shown diagonally extending in FIG. 1, and a front pickup slot 31, through the left upright 13. A guide track 32 in each compartment 29 directs the disposition and stacking of the plaques 22 stored therein, so that one plaque after another may be pulled out forwardly through the respective pick-up slot 31. A summary space 32 is provided at the top of the left upright 13, in which may be written, as by chalk, the total inventory for the day at hand.

As shown in FIGS. 2 and 3, the right and left yoke uprights 12 and 13 provide respective bosses 33, 34 on their inner surfaces near the tops thereof, in which are journalled the respective axle ends 36 and 37 of the axle 35 of an upper roller 38. Also, a lower roller 39 is shown having the right end of its axle journalled in an upright post or bracket 41, with a spacer flange 42 on the extreme right end of the axle 40 restraining the axle 40 (and its roller 39) from axial displacement. The axles 35 and 40 are connected to the respective rollers 38 and 39, through which they extend, by closure plates at the ends of the rollers, such closure plates 43 and 44 being shown in FIG. 2, as connecting the right ends of the respective upper and lower rollers 38, 29 to the respective axles 35, 40.

As indicated diagrammatically in FIG. 2, a shelf or cross-brace 45 extends between the uprights 12, 13 and supports thereon a motor M and a gear reduction G. R., which, through a transmission 46, supported from the left upright 13, drives a transmission belt 47, which extends around a transmission element, not shown, on the upper roller axle 35; to rotate the upper roller 38.

A timer is indicated as being provided and supported by the frame 11 to drive the motor M once each day, so that the motor M acts through the gear reduction G. R. and the transmission 44, as aforesaid, to rotate the upper roller 38 a peripheral distance equal to the height of a strip 18 or index square 16.

Four spaced apart belts 48 are provided, as shown in FIG. 2, to extend around the upper and lower rollers 38, 39, with the strips 18, indicated as wooden slats in FIG. 3, being connected to the belts along the longitudinally extending central area of their inner surfaces, as indicated by the reference numerals 49. In this manner the strips 18, which are relieved at their leading inner corners 50 and outer trailing corners 51, successively overlap and present a continuous front of parallel, longitudinally extending slats as indicated in FIG. 2, to form the display front 17.

As indicated in dotted lines in FIG. 3, a covering panel or enclosure 52 is provided to be hingedly connected at 53 to the title board or cross-member 14, and to be lockably or latchably connected at 54 to the front or trough front base board 26. Such a panel or latch cover 52 can be locked over the display board 17 of an inventory indicating device 10, as at closing time, or at any time it may be desirable to protect the display board 17 from interference with its arrangement; and as a matter of choice, such a latch cover 52 may be of transparent plastic, and kept locked over the display board 17 at practically all times. In this regard, since the trough 27 extends laterally beyond the display board 17, the plaques 22 falling off of the slats 18, could be retrieved with the cover panel 52 locked in place, as by a tool used to rake the plaques 22 to the end of the trough 27, there to be picked up manually.

FIG. 4, shows partially diagrammatically an alternative means for moving a slat 18 once each time interval. A cam shaft 55, journalled for rotation, as in the left upright, carries a cam 56 thereon. A pawl 57 on a pawl stud 58, also journalled in the left upright, includes a pawl cam 59, and has a pawl tooth 60 on its free end normally to latch in contact with a ratchet tooth 61 of a ratchet 62 which is mounted upon, and affixed to, the upper roller axle 35. A spring 68 is disposed to bear at one end, as against the frame, and at its other end against the pawl 57 opposite the pawl tooth 60, and normally urges the pawl tooth into latched engagement with a ratchet tooth 61 of the ratchet 62. When the cam shaft 55, as rotated by means, not shown, actuated by a time clock, also not shown, drives the cam shaft 55 to dispose its cam 56 into contact with the pawl cam 59, as shown, the ratchet 62 is unlatched from the pawl tooth 61, so that the ratchet 62, may be rotated to move the upper roller a circumferential or peripheral distance equal to the height of a slat 18 or index square 16.

A lost motion pawl 63 is shown in FIG. 4, as having a base 64 to which the outer end of a spring 64 is connected, the base end of the spring 64 bearing against, and being connected to, the frame 11. When the pawl tooth 60 clears the ratchet 62, the spring 64 compresses a parallel disposed spring 65 and draws the pawl 63 to the right, thereby moving the ratchet 62 to the right and thus in clockwise rotation as indicated in FIG. 4, and this continues until the lost motion pawl 63, having the slot 66 therein, moves to the right sufficiently for the left end of the slot to strike the stop bar 67 which extends transversely, as from the left upright 13, and through the slot 66, as this occurs the upper roller, not shown, has been rotated a distance equal to the height of a slat 18 or index square 16, as aforesaid.

As the cam shaft 55 continues rotation to carry the cam 56 clockwise, the spring 68 can begin urging the pawl tooth 60 against rotation of the ratchet 62, whereby the urging of the two springs 68 and 65 to the left, overcome the rightward urging of the spring 64, so that the lost motion pawl 63 is moved back to the left until the right end of the slot 66 contacts the stop bar 67 as the tooth of the lost motion pawl 63 engages a ratchet tooth 61, as shown in FIG. 4.

As shown in FIG. 5, a plaque 22 is indicated as being comprised of transparent plastic, with a slot 69 being provided which may optionally have one end closed. Also, a pair of slightly spaced apart bores or holes 70 are provided centrally through the upper part of the plaque, to receive a pair of slat hooks therethrough, as aforesaid. The plaques are hollow, by virtue of the slot 69, to receive an information card therein pertinent to the item, as an automobile, that the plaque represents in the inventory system. As these cards are variously printed, and in the case of automobiles, carry various information as serial numbers, motor numbers, allowed values, sales values, etcetera, no effort is made to show a card in the drawings, it only being necessary to say that the cards are of proper length, breadth and thickness to be readily disposed and held in the plaques, and that they are printed in manner that the data thereon may be read through the transparent plastic of the plaque, as to the plaque colors, exemplary of the use thereof, green plaques in FIG. 1, may represent cars which are in the first 30 day period of tenure; yellow plaques represent cars which are in the second 30 day period of tenure; and red represents cars which are in the third 30 day period of tenure. Also, a clear plastic case or plaque in any area 20 can represent a car in that respective tenure which has been taken from the lot, as to be specially serviced, or further repaired.

Following change of slat, strip or bar position, as each morning, the attendant picks up the cases or plaques which may have fallen from the lowermost slat 18, that has changed direction, at shift time, to pass under the lower roller 39, and takes out the respective stock card, not shown in the drawings, but hereinabove described. The attendant then places such stock card into a plaque 22 of that color representative of the next following 30 day period, and then hangs that plaque on the newly positioned top strip or bar 18, in the area 20 of the respective type of automobile the plaque is to represent. At the same time, any newly arrived cars are indicated in inventory for the date of entry, by placing appropriate stock cards in plaques of the first period color, as green, and placing them on the hooks 21 in the respective area 20 of the type of automobile the respective newly positioned plaques are to represent.

Each day at shift time, when the attendant collects the cases 22 which have fallen into the trough 27 and takes out the information cards therefrom, as aforesaid, he inserts the respective cases into their respective compartments; for instance the red, or 90 day period cases or plaques 22 are inserted in the upper compartment 29, the yellow or 60 day period cases in the compartment therebelow, and the green or 30 day period cases in the third compartment from the top. It follows that the fourth compartment from the top may receive the clear plaques or cases 22, and the lowermost compartment may serve, for any convenient purpose which may be dictated.

When a data card, identifying a car, has passed successivly through the green, yellow, and red plaques, whereby the car represented has passed through 90 days of tenure on the lot, the data card that has been removed is a basis for a full and more complete written record being made, expanding the data thereon, so that the dealer or general manager may make further decision as to the respective car whose profitable tenure in the lot has become questionable.

The use of clear plastic plaques 22 to indicate that a car, of the make corresponding with the area in which a respective plaque is disposed, is not on display, gives visual indication that the car represented by such a plaque should be hurried as to its repair, painting, or other maintenance, or returned from loan, so that it can continue to be displayed for sale.

The invention obviously is not limited to an inventory indicating device adapted only to automobile or used car lots, but can serve for many other usages. For instance it can serve for military purposes, as to indicate types of military units and their personnel strength or state of training; also it may be used for various mercantile inventories, as for the number of types of jewelry, and for a multitude of other utilitarian purposes, in business or government, where such inventories may serve.

Also the structure of the device may be made in various modifications, variations, and embodiments, especially as to the various components thereof. For instance the display face may be one continuous belt with equally, vertically spaced apart, transverse or laterally extending, horizontal lines, dividing the display face into strips, with equally or selectively spaced apart vertically extending lines dividing the display face into areas representative of different types of items under inventory. Also, the areas 20 may be of unequal widths, corresponding with the relative amount of traffic or itemization the respective areas are to indicate.

Also, as to the means for receiving the insert or data cards 71, instead of hollow plaques 22, plates 72 with upper and lower edges recurved outwardly, as indicated alternatively in FIG. 3, may be employed to receive the data cards 71 therein, the plates 72 being removably affixed to the strips by conventional means, not shown. Also, as another alternative arrangement, each plaque may have a magnet strip on the back thereof, while the strips 18 may be of metal, with a circuit, parallel with the circuit that causes the daily or periodical shift of a slat or strip width, being closed at shift time, and adapted to demagnetize the shifted strip as the shift is made, whereby the plaques on the de-magnetized strip may fall from such strip into the trough 27.

Additionally, the invention may have many features of expediency included therein, for instance the surface of the upper roller 38 may be serrated, as indicated by the dotted line 73 in FIG. 2 to avoid belt slippage at shift time, or the frame may be constructed in a variety of different manners to support the roller ends for rotation, or the means to effectuate the shift of a predetermined vertical distance once within a predetermined period of time may be carried out by many variations of structure.

Referring now to FIGS. 6–12, inclusive, a preferred form of the invention is shown, with an inventory indicating device 80 being shown isometrically in FIG. 1 as including a frame 81 with upstanding side members 82, 83, a lower cross-structure 84, including a trough or receptacle 85. Also, in FIG. 1, a top cross-member 86 is provided, employable as a title board and mounting a conventional electrical clock 87 as operated from the shop's source of electrical power.

The side members 82, 83, are each indexed vertically from one (1) to thirty (30), and in the space between side members and top and bottom cross-members, a gridded, metallic plate 88 is indicated as having a transparent belt 89 outwardly of, and supported by, the plate 88, with inventory members 90 being selectively disposed on the belt 89 over the appropriate rectangles, as shown in FIG. 6. Also glass panels 91a, 91b, are indicated as being slidable, one across the other, and locked together to cover and bar access to the belt 89 with inventory members 90 thereon. A lock 92a is mounted on a glass panel 91b with key 92b therein, as indicated in FIG. 6, and in greater detail in FIG. 8.

The vertically aligned time interval indicia 93, (from 1 to 30), correspond, as in the previously described case for FIGS. 1–6, with the days of a categorical period, as in the service history of an automobile. Then, the color or indicia corresponds with whether a respective automobile may be in the first, second or third 30-day period.

As best shown in FIG. 7, the belt 89 extends over an upper roller 94, and a lower roller 95, the rollers 94, 95 having their shafts journalled in the uprights or side members 82, 83. The lower roller 95 is mounted for adjustment by a plate 96 through which its shaft extends; the plate 96 being slotted and a bolt or machine screw 97 being passed through the slot 98 to be threaded into a stationary member, as an inner part 99 of the right upright 82. A pulley 100 is mounted on the shaft of the lower roller 95, and a pulley belt 102 connects the roller 95, by its pulley 100, to receive drive from a pulley 103 which is mounted on the shaft of a motor 104 indicated as being supported from the inner upright or side runner member 99, forming part of the left upright 82. A plate 105 is indicated as providing the journal for the shaft of the motor 104; the plate 105 being supported from the right upright 82, or its inner part 99.

Referring now to FIG. 11, the motor 106 which drives the timer 107 is in parallel circuit with a relay 108 and a switch 109 which is closed by the timer cam 107. Also, in parallel with these two parallel circuits is the circuit which includes the motor 104 in series with a switch 109 which is operated by the relay 108 to close circuit at predetermined intervals to drive the belt motor 104. A manually operable switch 110 is in parallel with the switch 109, and this switch 109 may be closed manually to drive the belt drive motor 104 whenever necessary.

As shown in FIG. 7 the switch 109 is mounted on a door or panel 111 which is accessible from outside of the right upright 82, the door 111 having a latch means 112 therein to lock it to the frame structure which includes the uprights 82, 99. A suitable latch 112 is provided on the panel or door 111 to latch it to the right upright 92. As a feature to note, storage spaces 113a, 113b, 113c and 113d may be seen in the right upright 92, which provide storage for the inventory members 90, by color or code class, as these members may be conveniently classified for storage.

The lower cross-structure 84 includes a cross-channel 114 between uprights 92, 93, and below the channel 114, a trough or receptacle 115 is provided, in the cross-section of an angle, as best seen in FIG. 7. Thus the inventory members that pass on the belt 89 around the curvature of the lower roller 95, will fall into the angle trough, as the belt strip carrying them, departs from over the lower row of rectangles on the plate 88, and thus away from the attraction of the metallic plate 88 to the magnetized parts of the inventory members. Then, as the trough or angle 115 is of metal, the inventory members 90 will be attracted to this structure into which they fall.

As best indicated in FIG. 9, an inventory member 90a is shown in position on the top strip of the belt 89 below the top roller 94. In this construction the shaft of the upper roller is indicated as being journalled in the side members or uprights 82, 83, with the upper cross-structure or cross member 86 including the top channel 116 being installed to bear with web against the top plate 117, also included by the cross-member 86. Clips 118 are provided in the center of each rectangular space 101, so that glass slabs 119 may be inserted, as required, properly to allocate the headboard area, as to the makes of automobiles, as indicated in FIG. 6.

Also, in FIG. 9 it should be noticed that the top plate 117 and the channel 116 are slotted or bored to provide an opening 132 in front of an electric light 120 mounted on a clip angle 121, these lights and bores being disposed for each type of automobile to be indicated, and thus centrally in front of a designating panel. The designating panels or glass slabs 119 are thus illuminated from behind or from within the inventory indicating device 80.

Inventory members 90a, as shown in FIGS. 9 and 10, and inventory members 90, as shown in FIGS. 6 and 7, are provided in colors representative of the time period in which the item the member represents may be. As shown in FIG. 10, a member 90a includes a metallic bar or strip 122 which has been magnetized, also a magnetized metallic clip 123 which extends downwardly centrally from the bar or strip 122. Also, such a member 90a, may have a non-metallic backing plate or shield 124, as shown in dotted lines in FIG. 10. This shield is substantially the same area as an indicia card 125 not shown in FIG. 10, but shown in FIG. 9 as engaged in the clip 123 and as having substantially the same area as the shield 124 which supports it.

As shown in FIG. 12, the inventory member 125a is encased or received in a non-metallic or plastic sheath 126 which carries a magnetized, metallic bar or rectangular plate 127. In area the sheath 126 is only slightly less than the area of the rectangular space 101 on the support plate 88 therebelow.

Details of roller support may be seen in FIG. 8 where the left upright or side construction 83 is shown as including a spacer strip 128 which mounts a bracket 129 which receives the end of the roller shaft 130 therethrough to pass through a bearing flange 131 outwardly of the bracket aforesaid.

Also, as special features it may be noticed in FIG. 6 that the designating trademark or insignia 133 of the manufacturer, or of the user may be displayed on the top cross-plate 134 to the right of the clock 87. Then to the left of the clock 87 upper and lower guide slots 135a, 135b are provided. These slots 135a, 135b are to receive therein, respectively, a strip having the estimated predetermined value of the inventory that, for best business practice, should be on the lot, or represented on the belt 89 at any time during an operating period, as $100,000 indicated in FIG. 6, and a strip having thereon the actual value of the inventory currently on the lot, as $108,000, as indicated in FIG. 6.

Transparent slips in color may be slid over the actual value designation for special information. For instance, a green strip over the actual designation could mean the inventory is slightly in excess of that planned for, or desired, or, a yellow strip over the actual value designation could mean the inventory was in some objectionable excess over that desired or set for a performance guide; or a red strip over the actual value designation could mean that the actual inventory was dangerously high, requiring special performance to reduce as quickly as possible.

The device 80 may be permanently located at a place easily observable, and not necessarily equipped with legs or casters. However, as shown in FIG. 6, legs 136a 136b are provided, on casters 137, so that the device 80 is readily portable or transportable from place to place, if such is desired.

In effect the invention is not limited to any of the combinations of structures hereinabove described, but considers a wide variety of other structures and combinations of elements, as long as such fall within the broad spirit of the invention, and within the broad scope of interpretation claimed for, and merited by the appended claims.

What is claimed is:

1. An inventory indicating devise comprising an upstanding yoke-type frame, upper and lower roller means journalled therein, continuous belt means extending around said roller means, a predetermined plurality of indexed spaces of equal, predetermined height, vertically aligned on one side of said frame, said belt means being divided into a predetermined plurality in excess of twice said index spaces of laterally parallel extending equal length metallic strips, there being a predetermined plurality of horizontally spaced apart, vertically extending lines on said strips to divide off said belt means into parallel, vertically extending indicative areas, plaque means in a plurality of indicia representative of respective inventory item conditions, each carrying a metallic plate in the inner surface thereof, and means operative at strip shift time to demagnetize the strip that is lowermost as it changes direction to pass under said lower roller means, said frame having mounted thereon time control means connected to, and adapted to drive one of said roller means once in a predetermined time interval to move said belt means a distance in travel equal to an index space height, whereby once in each predetermined time interval, plaque means, as appropriate, may be installed on a strip, as moved into top position to indicate any added inventory items, and any plaque means, as appropriate, is the aforesaid strip which is lowermost.

2. An inventory indicating device as claimed in claim 1, in which said index spaces are thirty consecutively numbered, and in which time control means drives said belt means once each day a distance equal to the height of one index space.

3. An inventory indicating device as claimed in claim 1, in which said plaque means are colored in a plurality of predetermined colors representative of tenure periods in which an automobile may be on a car lot.

4. An inventory indicating device as claimed in claim 1, in which said plaques carry a magnetic plate on the inner surface thereof and in which said strips are metallic, and which includes means operative at strip shift time to de-magnetize the lowermost strip as it changes direction to pass under said lowermost roller.

5. An inventory indicating device, as claimed in claim 1, in which said belt means comprises a continuous belt divided into equal strip widths by parallel, lateral lines, and divided into areas by laterally spaced apart vertical lines on said belt.

6. An inventory indicating device as claimed in claim 1, in which said strips are mounted along the inner, horizontally extending central surfaces thereof, upon laterally spaced apart belts included by said belt means, each strip being relieved at leading inner corner and trailing outer corner, whereby said strips present forwardly a continuously display board, while said belt means is thus flexible to permit said belt means to be moved around said roller means.

7. An inventory indicating device as claimed in claim 1, in which said plaques comprise slide plates and data cards slidable thereinto.

8. An inventory indicating device as claimed in claim 1, in which sail plaques comprise hollow plastic cases and a data card insertable into each case.

9. An inventory indicating device as claimed in claim 1, in which the side of said frame opposite said index spaces comprises compartments in which said plaques may be selectively slidably stored, and slidably removed therefrom.

10. An inventory indicating device comprising a frame, upper and lower roller means journalled therein, continuous transparent belt means extending around said roller means, a predetermined plurality of index spaces of equal predetermined height vertically aligned and horizontally separated on one side of said frame, a belt-supporting, substantially belt-width, metallic plate extending between said roller means with outer surface divided into a grid with rectangles horizontally aligned with index spaces, inventory members including magnetized means disposed chronologically vertically and horizontally by type and condition on said belt over said rectangles, said frame having mounted thereon time control means connected to drive one of said roller means once in a predetermined time interval to move said belt means a distance in travel equal to the height of one index space, the inventory members on the belt strip moved off the lowermost row of rectangles falling off the belt into a receptacle included by said frame, and the belt strip moved over the top row of rectangles to receive inventory members selectively placed thereon over the uppermost row of rectangles.

11. An inventory indicating device as claimed in claim 10 in which said inventory members each comprise a magnetized metallic plate and clip and a non-metallic backing plate under said clip, and a non-metallic card insertable in said clip.

12. An inventory indicating device as claimed in claim 10 in which said inventory members each comprise a magnetized metallic means, a non-metallic card supporting means attached thereto, and a non-metallic indicia card supported by said supporting means.

13. An inventory indicating device as claimed in claim 10 in which said time control means comprises, in parallel, a timer motor; a relay with timer motor driven cam closing relay circuit; and a roller drive motor with relay closed circuit.

References Cited
UNITED STATES PATENTS 1,372,970    3/1921    McDonnell _____ 40—32
3,225,473    12/1965    Bailey _____ 40—124

EUGENE R. CAPOZIO, *Primary Examiner.*

W. J. CONTRERAS, *Examiner.*